United States Patent
Golin et al.

(10) Patent No.: US 10,652,080 B2
(45) Date of Patent: May 12, 2020

(54) SYSTEMS AND METHODS FOR PROVIDING A NOTIFICATION SYSTEM ARCHITECTURE

(71) Applicant: Everbridge, Inc., Glendale, CA (US)

(72) Inventors: Eric Golin, Newton, MA (US); Jia Xi, Lexington, MA (US); Yuanjin Xu, Burlington, MA (US); Christopher Chaulk, Franklin, MA (US); Yuan Cheng, Boxborough, MA (US); Yang Liu, Beijing (CN); Konstantin Zilberberg, Acton, MA (US)

(73) Assignee: Everbridge, Inc., Pasadena, CA (US)

( * ) Notice: Subject to any disclaimer, the term of this patent is extended or adjusted under 35 U.S.C. 154(b) by 350 days.

(21) Appl. No.: 15/819,960

(22) Filed: Nov. 21, 2017

(65) Prior Publication Data

US 2018/0145871 A1 May 24, 2018

Related U.S. Application Data

(60) Provisional application No. 62/425,033, filed on Nov. 21, 2016, provisional application No. 62/425,037, filed on Nov. 21, 2016.

(51) Int. Cl.

| | |
|---|---|
| *H04L 15/16* | (2006.01) |
| *H04L 12/24* | (2006.01) |
| *G06F 16/903* | (2019.01) |
| *G06F 9/54* | (2006.01) |
| *H04L 12/58* | (2006.01) |
| *H04L 29/08* | (2006.01) |
| *H04W 4/06* | (2009.01) |
| *H04W 68/06* | (2009.01) |

(52) U.S. Cl.
CPC .......... *H04L 41/0672* (2013.01); *G06F 9/542* (2013.01); *G06F 16/903* (2019.01);
(Continued)

(58) Field of Classification Search
CPC .............................. H04L 47/50; H04L 47/621
(Continued)

(56) References Cited

U.S. PATENT DOCUMENTS

| | | |
|---|---|---|
| 2013/0089101 A1 | 4/2013 | Kamath et al. |
| 2014/0068611 A1 | 3/2014 | McGrath et al. |

(Continued)

OTHER PUBLICATIONS

Ronglong Suhat et al; "Signal: An open-source cross-platform universal messaging system with feedback support" Journal of Systems & Software, Elsevier, North Holland, New York, NY, US. vol. 117, Feb. 23, 2016; 25 pages.
(Continued)

*Primary Examiner* — Wing F Chan
*Assistant Examiner* — Andrew Woo
(74) *Attorney, Agent, or Firm* — Norton Rose Fulbright US LLP

(57) ABSTRACT

Systems, methods, and computer-readable storage media providing highly scalable and fault tolerant notification systems are disclosed. Disclosed notification systems may be configured to: receive a plurality of notification requests including message content and recipient information, which may be allocated to at least one notification engine for processing. A notification engine may be configured to: generate a plurality of attempts corresponding to notification requests allocated for processing by the first notification engine and assign each generated attempt to a particular attempt queue. A plurality of connectors may be configured to: select a set of attempts for transmission from the plurality of attempt queues, transmit the set of attempts via at least one communication network. One or more databases may be provided to store status information associated with processing of notification requests by the first notification engine.

14 Claims, 3 Drawing Sheets

(52) U.S. Cl.
CPC .......... *H04L 41/0668* (2013.01); *H04L 51/24* (2013.01); *H04L 51/28* (2013.01); *H04L 67/26* (2013.01); *H04W 4/06* (2013.01); *H04W 68/06* (2013.01); *G06F 9/546* (2013.01)

(58) Field of Classification Search
USPC ................................................ 709/204, 206
See application file for complete search history.

(56) References Cited

U.S. PATENT DOCUMENTS

| | | |
|---|---|---|
| 2014/0282694 A1 | 9/2014 | Zaveri et al. |
| 2016/0103750 A1 | 4/2016 | Cooper et al. |
| 2016/0275123 A1* | 9/2016 | Lin ...................... G06F 9/4881 |
| 2017/0171112 A1 | 6/2017 | Saint-Etienne et al. |
| 2017/0214762 A1* | 7/2017 | Swain .................. H04L 67/2842 |
| 2018/0024929 A1 | 1/2018 | Greiner et al. |
| 2018/0212710 A1 | 7/2018 | Ronneke et al. |
| 2019/0021032 A1 | 1/2019 | Bergstrom et al. |

OTHER PUBLICATIONS

Anonymous; "Official guide to Notification System for Operators, Device Makers and Developers": NewBay White Paper, Mar. 31, 2011: 17 pages.

International Search Report and Written Opinion issued for PCT Application No. PCT/US2017/062870, dated Feb. 24, 2018; 15 pages.

* cited by examiner

400

410 — Receive, by a notification management service of a notification system, a plurality of notification requests

420 — Allocate, by the notification management service, each notification request of the plurality of notification requests to at least one notification engine

430 — Generate, by a first notification engine of the one or more notification engines, a plurality of attempts

440 — Assign, by the first notification engine, each attempt of the plurality of attempts to a particular attempt queue

450 — Select a first set of attempts from among the plurality of attempt queues

460 — Transmit, via at least one connector of the first plurality of connectors

470 — Generate, by a first notification engine of the one or more notification engines, a first plurality of attempts

FIG. 4

SYSTEMS AND METHODS FOR PROVIDING A NOTIFICATION SYSTEM ARCHITECTURE

CROSS REFERENCE TO RELATED APPLICATION

The present application claims the benefit of U.S. Provisional Patent Application No. 62/425,037 filed Nov. 21, 2016 and entitled "SYSTEMS AND METHODS FOR PROVIDING AN IMPROVED NOTIFICATION SYSTEM ARCHITECTURE," and claims the benefit of U.S. Provisional Patent Application No. 62/425,033 filed Nov. 21, 2016 and entitled "SYSTEMS AND METHODS FOR PROVIDING ADAPTIVE FLOW CONTROL IN A NOTIFICATION ARCHITECTURE," the disclosures of which are incorporated by reference herein in their entirety.

TECHNICAL FIELD

The present application is generally related to notification systems. More particularly, the present application is directed to improved system architectures for providing a notification system.

BACKGROUND

Notification systems are configured to transmit notifications to one or more intended recipients. Notifications may be provided to the one or more intended recipients via different types of messages, such as text messages (e.g., short messaging service (SMS) messages), multimedia messaging service (MMS) messages, e-mail messages, automated voice response (AVR) system messages, and the like. However, existing notification systems suffer from several drawbacks, such as experiencing performance degradation for certain types of messages or under particular load conditions.

SUMMARY

Notification systems are designed to generate and broadcast messages to one or more intended recipients. A notification broadcast may comprise transmission of a plurality of messages, referred to herein as attempts. The plurality of messages may comprise different types of attempts, such as e-mail messages, automated voice response (AVR) messages, short messaging system (SMS) messages, or other types of messages, and each different type of attempt may utilize a different communication channel or path to transmit the attempt to the intended recipient. For example, an attempt utilizing an SMS message may be transmitted to the intended recipient utilizing infrastructure of a cellular network, transmission of an AVR message may utilize infrastructure of a public switched telephone network (PSTN) and/or cellular network, and transmission of an e-mail message may utilize the Internet and one or more servers (e.g., one or more e-mail servers).

Notification broadcasts may be requested for various reasons and/or purposes. For example, if an emergency situation (e.g., a fire, a tornado, a multi-car collision, and the like) occurs in a particular geographic area or location, an entity may request transmission of a notification broadcast in a particular geographic area to inform intended recipients (e.g., people living in, or proximate to the particular geographic area) of the emergency situation. As another example, an entity hosting an event that is open to the public may request transmission of a notification broadcast to inform members of the public of the event and to encourage attendance of the event. It is noted that there are numerous other types of situations for which notification broadcasts may be requested, and the specific examples above have been provided for purposes of illustration, rather than by way of limitation. The notification requests may be received by the notification system via one or more application interfaces, and may include details regarding a configuration of the notification broadcast, such as how attempts should be transmitted to intended recipients (e.g., as an e-mail message, an SMS message, and the like), message content (e.g., the information that the attempt should communicate to the recipients), information identifying a pool of recipients that are to receive the attempts of the broadcast, one or more communication channels (e.g., communication networks paths) upon which to transmit the attempts, other details of how the attempts should be sent, or a combination thereof.

In accordance with the present disclosure, a notification architecture for providing a notification system may support complex workflows. For example, the workflow may include sending an attempt (e.g., a message) to a recipient across one or more communication paths or multiple times (cycles). Additionally, the workflow may support bi-directional notifications, where the notification system is configured to collect responses from recipients of attempts corresponding to one or more broadcasts. The responses may include simple confirmation of the receipt of the attempt, positive or negative acknowledgments, answers to questions included in the attempt, other types of responses, or a combination thereof. The responses may be used by the notification system to modify or further execute the workflow. For example, a response confirming receipt of the attempt may cause a notification engine, which is the portion of the notification system responsible for generating and scheduling transmission of attempts to intended recipients, to stop sending attempts for that broadcast to the recipient even if a notification request from which the attempt was generated specified additional communication paths or cycles for transmission of the attempt (e.g., if the recipient confirms receipt of an attempt transmitted as an SMS message, the notification system may forego transmission of the attempt as an e-mail message, as an AVR message, or some other type of message specified in the notification request as a secondary communication path for providing the attempt to the recipient). Additionally, notification systems of embodiments may support more complex workflows, such as halting processing of a notification request after acknowledgment of attempts are received from a threshold number of recipients, where the threshold may be configured to provide a level of confidence that the attempts of a broadcast are being successfully received by the intended recipients.

In contrast to legacy notification systems and their architectures, which are highly centralized, difficult to scale, and experience various performance degradations under different operational scenarios (e.g., notification system failures, mixed size broadcasts, and the like), the notification system architectures in accordance with embodiments of the present disclosure may solve and/or eliminate many of the drawbacks experienced by legacy notification systems by providing a modular approach to processing a notification workflow and may be easily extended to support new types of broadcasts and/or ranges of broadcast sizes and may. For example, as described in more detail below, the notification system architecture of the present disclosure may provide improvements with respect to notification system scalability, capabilities to support processing of large broadcasts, small broadcasts, and/or mixes of large and small broadcasts without causing degraded performance with respect to the processing of one type and/or size of broadcast in favor of another type and/or size of broadcast. Improving the scalability of notification systems may enable those systems to be scaled up and down more rapidly (e.g., bringing additional resource "online" to allow processing of more broadcasts when high loads are experienced).

Further, the disclosed notification system architecture may implement adaptive flow control techniques to improve handling and processing of different types of broadcasts. For example, the notification system architecture may enable a notification system to implement a weighted fair queuing mechanism that allows for processing of broadcasts having different priority levels and/or different broadcast sizes simultaneously while also incorporating anti-starvation mechanisms to ensure that broadcasts of a particular priority level and/or a particular size do not inhibit processing of broadcasts of a different priority level and/or a different size. Exemplary embodiments of weighted fair queuing mechanisms and anti-starvation mechanisms that may be implemented by a notification system configured according to the notification system architecture disclosed herein are described in commonly owned U.S. patent application Ser. No. 15/820,339 filed on Nov. 21, 2017, issued on Feb. 4, 2020 as U.S. Pat. No. 10,554,430, filed concurrently herewith, the contents of which are expressly incorporated herein by reference in their entirety.

The disclosed notification system architecture may also provide a multi-tenant notification system, which is a notification system that can transmit attempts associated with multiple notification requests on behalf of one or more users concurrently. Another advantageous aspect of the disclosed notification system architecture is that it provides high scalability. For example, components of the notification system may be dynamically brought online or taken offline to address various operating conditions experienced by notification system, such as bringing additional components online to alleviate high loads on the notification system. Additionally, the notification system architecture is configured to provide an active-active notification system that is able to rapidly recover from various failure conditions and resume notification request processing with little downtime, without duplicating processing that occurred prior to the failure, and without needing to reserve processing resources on standby or mirror information across multiple databases. In contrast, legacy notification systems implement active-passive notification systems, where one set of processing resources is used to actively process notification requests and another set of processing resources are reserved to take over processing in the event the active processing resources fail. The processing resources that are reserved are held in an idle or passive state until they need to be activated (e.g., to take over when the active processing resources fail). This approach often requires data, such information stored in a database utilized by the active processing resources to be mirrored to a second database configured to support the passive processing resources in the event that they need to be transitioned into the active state.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 4 a flow diagram of an exemplary method for processing one or more notification requests via a notification system implementing a notification system architecture in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
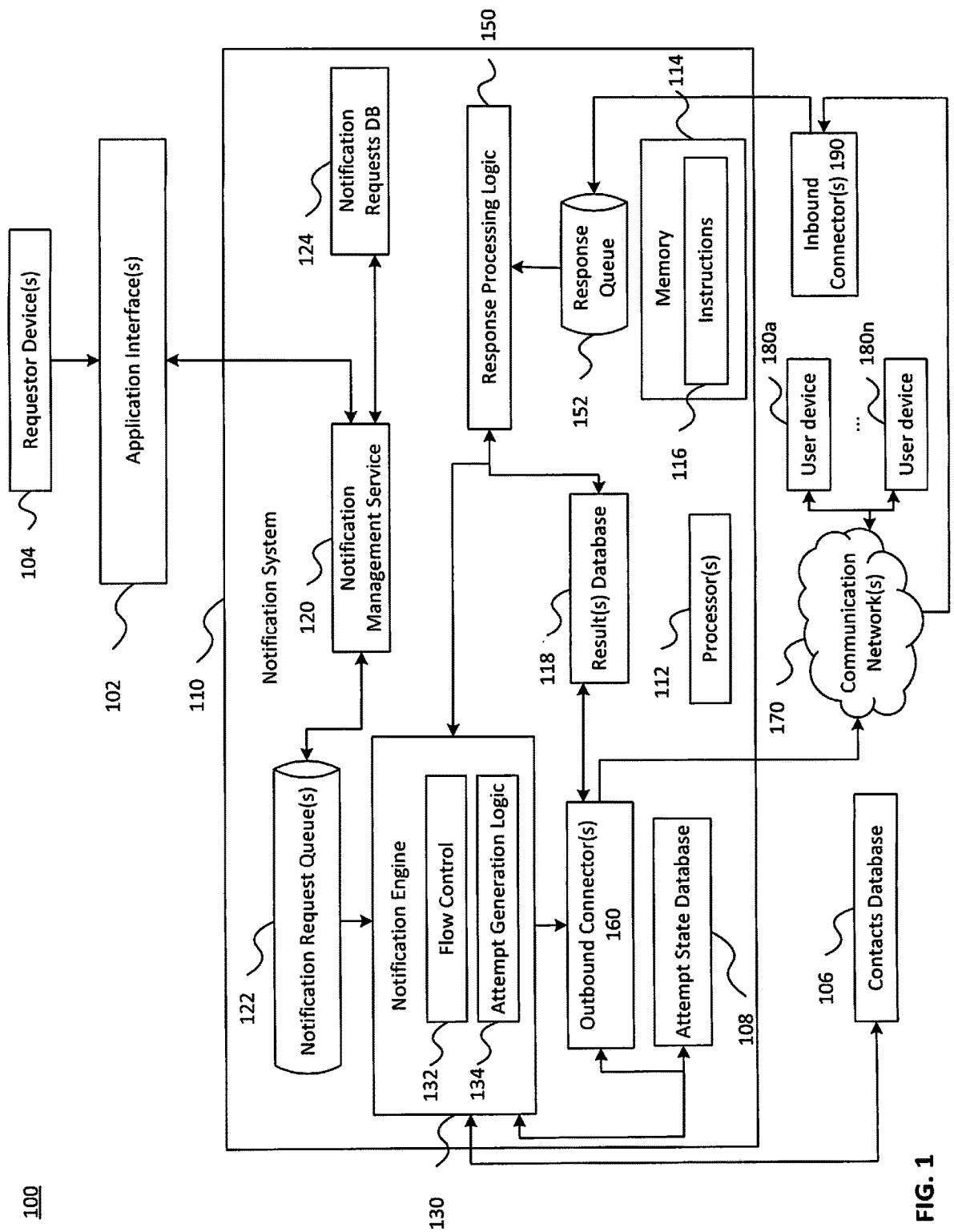
FIG. 1 is a block diagram of an exemplary notification system architecture in accordance with an embodiment of the present disclosure.

Referring to FIG. 1, a block diagram illustrating an exemplary notification system architecture in accordance with an embodiment of the present disclosure is shown as a notification system architecture 100. As shown in FIG. 1, the notification system architecture 100 may include a notification system 110. The notification system 110 may provide a notification management service 120 that may be configured to receive notification requests from one or more requestors via application interface(s) 102 and requestor devices 104. In embodiments, the application interface(s) 102 may be web-based interfaces provided by one or more web pages, or may be graphical user interfaces (GUIs) provided by a standalone application (e.g., an application provided by an operator of the notification system 110 or an application that has been configured to communicate with the notification system 110 via the application interface(s) 102), such as an application executing on the requestor device 104.

The application interface(s) 102 may provide functionality that facilitates configuration of a notification request. For example, a requestor desiring to create a notification broadcast may utilize the application interface(s) 102 to identify one or more intended recipients of the broadcast, specify message content to be included in the broadcast, configure a priority level of the broadcast, or other parameters. In embodiments, the one or more intended recipients may be identified by specifying one or more e-mail addresses, one or more telephone numbers, one or more usernames (e.g., for users that have registered to receive notifications from the notification system 110), or other information that may be utilized by the notification system 110 to determine the manner in which to provide the broadcast to an intended recipient.

Additionally, the notification system 110 may be configured to store and maintain information that may be used to identify intended recipients. For example, the notification system 110 may maintain a database 106 storing contact information for potential recipients. The contact information may include telephone numbers, e-mail address, usernames, address information, and other information that may be used to identify intended recipients. In an embodiment, the contacts database 106 may be maintained outside the notification system 110. In additional or alternative embodiments, the contacts database 106 may be maintained within the notification system 110, but may be external to various components of the notification system 110, such as the notification engine(s) 130 and/or the notification management service 120. In an embodiment, the contacts database 106 may be a distributed database, where portions of the contacts database 106 are stored at memory resources associated with various geographic regions. This may facilitate improved operations for the notification system 110. For example, contact information for recipients within a particular geographic region may be stored at a contacts database 106 associated with the particular geographic region. In an embodiment, the contact information stored in the contacts database(s) may be updated independent of its usage to facilitate processing of notification requests. Additionally, when a notification request is processed by a notification engine 130, the notification engine 130 may retrieve a fresh copy of the contact information for all of the recipients associated with the notification request. In an embodiment, the copy of the contact information may only be used for processing the notification request for which the contact information was retrieved (e.g., to maintain the most up-to-date copy of the contacts information that is utilized for processing notification requests). In an additional or alternative embodiment, the copy of the contact information may be used to process multiple notification requests (assuming that the multiple notification requests identify overlapping sets of intended recipients). If a notification request identifies intended recipients that are not included in the local copy of the contacts database 106, the notification engine 130 may retrieve contact information for those recipients from the contacts database 106. Additionally, the notification engine 130 may be configured to periodically refresh the local copy of the contact information (e.g., to prevent usage of stale or expired contact information).

Maintaining the contacts database 106 may enable the notification system 110 to process notification requests that identify intended recipients generally (e.g., based on a geographic location, demographic information, or other categorical classifications of intended recipients), rather than specifically (i.e., without requiring the notification request to specifically identify each intended recipient and without including each intended recipients' contact information). For example, a requestor may configure a notification request and the notification request may identify the intended recipients as all residents within a particular zip code. The notification system 110 may be configured to access the information stored in the database 106 to identify a pool of intended recipients for the broadcast, such by matching the zip code specified by the requestor with recipient address information stored in the database.

As explained above, the contacts database 106 may comprise a plurality of distributed contacts databases. For example, each of the various geographic regions (e.g., country, state, etc.) supported by the notification system architecture 100 may include one or more contacts databases 106 that store contact information for potential recipients within the corresponding geographic region. These different contacts databases 106 may be utilized for attempt generation by notification engines serving those different geographic regions or for other purposes. This ensures that sensitive information, such as telephone numbers, names, addresses, and the like are not exported outside of the geographic region where the contacts database is located and eliminates or reduces the need to mask portions of the contact information during use by the notification engines.

The message content to be included in the broadcast may include text information, graphical information, a universal resource locator (URL), a telephone number, other information that may be used to provide information to a recipient of the broadcast, or a combination thereof. For example, where text is utilized, the broadcast may include a message that describes an event that is the subject of the broadcast, such as information describing a location of a weather event (e.g., a tornado sighting, a wildfire, a flooded road, and the like). Where graphical information is included, the broadcast may include one or more images, video content, audio content, or a combination thereof. For example, the broadcast may include a map showing a location of an event described in a broadcast. When a URL is provided in a broadcast, the URL may provide link to a website or a page of a website where the recipient can obtain information about the event. For example, when the event is associated with an upcoming concert, the URL may provide a link to a website that describes the location of the concert, a list of bands that are playing at the concert, and other information (e.g., information on how to purchase tickets to the concert and the like). When a telephone number is included in the broadcast, the recipient may call the telephone number to obtain information about the event that is the subject of the broadcast. For example, the requestor may create an automated voice response (AVR) system message designed to communicate information to the user, and the user may access the AVR message by calling the telephone number included in the broadcast. One scenario where these types of broadcasts may occur is customer satisfaction surveys, where a merchant creates an AVR message that asks the recipient for information about a recent experience the recipient had with the merchant. The recipient may interact with the AVR message, such as to provide feedback to the merchant, via inputs provided through selection of one or more keys on the recipients communication device (e.g., a standard telephone device coupled to a public switched telephone network (PSTN), a smart phone, a cellular phone, a tablet computing device, or some other computing capable of accessing an AVR message, such as a voice over Internet protocol (VoIP) enabled device). It is noted that attempts of a broadcast may include various different types of information, such as one or more of the different types of information described above. For example, an attempt may include text content, multimedia content (e.g., images, video, audio, and the like), URL content, and/or other types and combinations of message content.

The notification architecture 100 and the notification system 110 may be configured to support small broadcasts, such as transmission of a broadcast to a single recipient, as well as large broadcast, such as transmission of a broadcast to a mass audiences. Additionally, the notification architecture 100 and the notification system 110 may be configured to support structured one-way notifications (e.g., broadcasts that do not solicit a response from the recipient(s)), as well as two-way or bi-directional broadcasts (e.g., broadcasts that solicit a response from at least one recipient). As an example of a bi-directional broadcast, the notification system 110 may be configured to generate a text-based broadcast, such as a short messaging service (SMS) message, and the recipient may reply to the SMS message to provide feedback to the notification system 110, as described in more detail below. In another example, a broadcast including a URL may link the recipient to a webpage that includes a form, such as a survey, that the recipient can fill out to provide information to the notification system 110. It is noted that the particular types of messages, message content, and feedback mechanisms described above have been provided for purposes of illustration, rather than by way of limitation, and notification systems in accordance with the present disclosure may be configured to utilize other types of messages, message content, and feedback mechanisms, or a combination of different messages, message content, and feedback mechanisms depending on the needs of a particular broadcast.

In accordance with the present disclosure, notification systems, such as the notification system 110, may be configured to utilize multiple priority levels, such as a high priority level for broadcasts that are expected to be transmitted to and received by the intended recipients immediately (e.g., as fast as the notifications can be generated and sent by the notification system and any intermediate networks used to transport the notifications from the notification system to the intended recipients), and a normal priority level for notifications that are expected to be communicated to and received by the intended recipients quickly, but not necessarily immediately (e.g., some delay is tolerable). It is noted that some embodiments may be configured to utilize more than two priority levels, such as a high priority level, a low priority level, and a normal priority level. Further, it is noted that high priority level broadcasts may not necessarily require or indicate that the broadcasts are to be generated immediately. High priority broadcast may also indicate that the attempts of the broadcast should be transmitted with reasonable assurance of receipt, that multiple transmission channels (e.g., multiple different types of messages/connectors/communication networks) should be utilized to transmit the attempts of the broadcast to increase the likelihood that the attempts are received quickly. For example, a user may have Internet access to receive an e-mail attempt but may not have cellular service to receive an AVR attempt. By initiating transmission of multiple attempts to each recipient across multiple channels, a likelihood that the intended recipient receives the attempt may be increased. It is noted that the various priority levels and their possible meanings, as described herein, have been provided for purposes of illustration, rather than by way of limitation, and that notification systems configured in accordance with the notification architecture 100 may utilize other priority level descriptors and meanings.

As shown in FIG. 1, the notification system 110 may include one or more processors 112 and a memory 114. The memory 114 may store instructions 116 that, when executed by the one or more processors 112, cause the one or more processors 112 to perform the operations for facilitating configuration of notification requests and for generating one or more broadcasts based on received notification requests, as described herein with respect to FIGS. 1-3. The memory 114 may also store one or more databases, such as the aforementioned database 106 of recipient information. As described in more detail below, the notification architecture may further utilize additional databases to facilitate various operations for processing notification requests and/or to facilitate transmission of broadcasts to one or more intended recipients.

In embodiments, the one or more processors 112 and the memory 114 may form or be part of a pool of computing resources (e.g., processor resources, memory resources, etc.), which may be dynamically provided and utilized in various capacities to facilitate the operations of the notification system 110. For example, in embodiments, the notification system architecture may be implemented as a cloud-based notification system and may utilize a collection of computing resources (e.g., the one or more processors 112) and data storage resources (e.g., the memory 114) accessible via one or more networks and one or more geographic locations. Implementing the notification architecture 100 in the cloud may facilitate improvements with respect to various aspects of the operations performed by the notification system 110, as described in more detail below.

The notification architecture 100 may utilize a multi-tiered or distributed approach to manage and process notification requests. For example, the notification architecture 100 may utilize a "global" notification management service 120 configured to manage the distribution of notification requests to notification engines, such as the notification engine 130, and may utilize a "local" notification service to manage expansion of notification requests into one or more broadcasts. It is noted that the terms "global" and "local" are not used in the literal sense. For example, in an embodiment, the notification management service 120 may be facilitated by one or a plurality of notification systems 110 and the term "global" notification management service 120 may serve to indicate that the notification management service 120 serves the entire notification system (e.g., distributes notification requests to various notification engines 130 to facilitate efficient handling of received notification requests). In an embodiment, the notification systems 110 utilized to provide the notification management service 120 may be geographically distributed, but may not necessarily be located globally. The notification management service 120 may be configured to receive notification requests from the application interface(s) 102 and to distribute the requests to one or more notification engines for processing (e.g., expansion of the notification request into one or more attempts for transmission to intended recipients). In an embodiment, the notification management service 120 may be supported by one or more notification request databases 124 and one or more notification request queues 122. The notification request database(s) 124 may be configured to keep track of received notification requests as well as the status of processing of the notification requests, such as to provide a record of which notification engine a particular received notification request has been assigned. The notification queue(s) 122 may be configured to store received notification requests for subsequent distribution or assignment to one or more notification engines 130.

In addition to the notification request database 124, the notification system architecture 100 may utilize one or more attempt state databases 108. Each attempt state database(s) 108 may be utilized and maintained by a particular notification engine(s) 130 to track the status of the processing of notification requests assigned to the particular notification engine 130. In an embodiment, each attempt state database may be maintained locally (e.g., local to the corresponding notification engine 130), which may facilitate faster processing of notification requests and which may enable performance improvements to be realized with respect to transmission of one or more broadcasts. For example, by maintaining the attempt state database 108 locally, the corresponding notification engine 130 may determine the status of its broadcasts more quickly, and may not be prevented from accessing the information stored therein. This may be enabled by the improved horizontal scalability provided by the notification system architecture of the present disclosure. For example, whereas legacy notification systems utilize a centralized approach that utilized various external databases to store information, the notification engine 130 may be distributed across many processors and memory resources, enabling the amount of memory resources available to the notification engine 130 for storing data to be expanded or reduced as needed. Because the data held in the attempt state database 108 and the notification results database 118 are primarily used for failure recovery which is an exceptional condition, the information stored in those databases may be more efficiently updated via batching various smaller data updates together, which may reduce the performance overhead associated with database interaction by the notification engine 130 and amortizing the overhead over the generation of many attempts. Thus, the notification architecture of embodiments may reduce or eliminate at least some of the bottlenecks present in legacy notification systems.

The attempt state database(s) 108 may be configured to store information associated with various aspects of generating and transmitting one or more broadcasts. For example, the information stored at the attempt state database 108 may include at least one of: information that identifies attempts that have been generated by the notification engine, information that identifies a transmission status of each of the attempts that have been generated by the notification engine, information that indicates a receive status for attempts transmitted via one or more connectors corresponding to the notification engine, and response information associated with one or more responses to the attempts transmitted via the one or more connectors that corresponds to the notification engine. It is noted that the exemplary types of information stored at the attempt state database 108 have been provided for purposes of illustration, rather than by way of limitation and that the attempt state database 108 may store additional types of information and/or other types of information in accordance with embodiments.

Additionally, the notification architecture 100 may include a result database 118. The result database 118 may store information associated with received responses for all attempts that have been transmitted. It is noted that the exemplary information described as being stored at the result database 118 has been provided for purposes of illustration, rather than by way of limitation, and the result database 118 may store additional information in accordance with embodiments of the present disclosure.

Configuring the notification system 110 based on the notification architecture 100, which includes the three databases described above (e.g., the attempt state database 108, the results database 118, and the notification request database 124), may increase the reliability and/or robustness the notification system 110. For example, the notification request database 124 may be used to monitor progress of the processing of received notification requests by one or more notification engines 130, enabling the notification management service 120 to monitor the load at each of the notification engines. This may enable the notification management service 120 to dynamically assign received notification requests to the notification engines in a manner that avoids overloading any one particular notification engine, and may further enable the notification management service 120 to dynamically bring new notification engines online in response to particular loading conditions detected by the notification management service 120, as described in more detail below. Additionally, the information stored at the notification request database 124 may enable the notification management service 120 to identify when a notification engine has failed to fully process a notification request.

The attempt state database 108 may be used by its corresponding notification engine 130 to restart processing of a notification request in the event of a failure of a component of the notification engine (e.g., to ensure that all of the attempts which are generated for the notification request are processed by an outbound connector 160 and transmitted to the intended recipients via a communication network). In the event that a notification engine fails, the results database 118 may be used to recover processing notification request that were being handled by the failed notification engine. For example, when a notification engine fails, the notification requests that were assigned to the failed notification engine may be reassigned to another notification engine or to a new notification engine that may be brought online in response to the failure, and the information stored in the results database 118 may be used to determine which attempts were successfully delivered prior to the failure, which may allow the newly assigned notification engine to resume processing of the notification requests without retransmitting attempts that have already been successfully completed. Additional features and benefits provided by the attempt state database 108, the results database 118, and the notification request database 124 are described in more detail below.

The notification system 110, and more specifically, the notification management service 120, may be configured to establish one or more notification request queues 122. As notification requests are received by the notification system 110 (e.g., by the notification management service 120) from the application interface(s) 102, they may be assigned to the one or more notification request queues 122. Notification requests assigned to the one or more notification request queues 122 may be subsequently retrieved for processing (e.g., expansion of the notification request into a broadcast including one or more attempts) by one or more notification engines 130, where a particular notification engine 130 of the one or more notification engines 130 is configured to retrieve notification requests from the notification request queue(s) 122 only after those notification requests have been assigned to the particular notification engine 130 by the notification management service 120.

In an embodiment, the notification request queue(s) 122 may be established using a centralized approach, where all notification requests are received and queued at a central location (e.g., at a single server or one or more agents running on a server and/or a cloud-based system to receive all notification requests for the notification system 110). Additionally or alternatively, a decentralized approach may be utilized. For example, the notification system 110 may utilize geographically distributed servers and/or agents running on a server or cloud-based system to receive notification requests, and these notification requests may be placed into notification request queues that more closely approximate the target area for distribution of the broadcasts. In another example, notification requests may be received at a central location (e.g., a centralized server) where they are analyzed to identify one or more target areas for distribution of broadcasts, and then, based on the analysis, assigned to one or more notification request queues that approximate the target area for distribution. In this example, it is possible that a notification request can be queued at multiple locations, such as where a notification request identifies target areas for distribution corresponding to a plurality of geographic areas (e.g., a portion of the notification request may be queued in each of the plurality of geographic areas).

Figure 2:
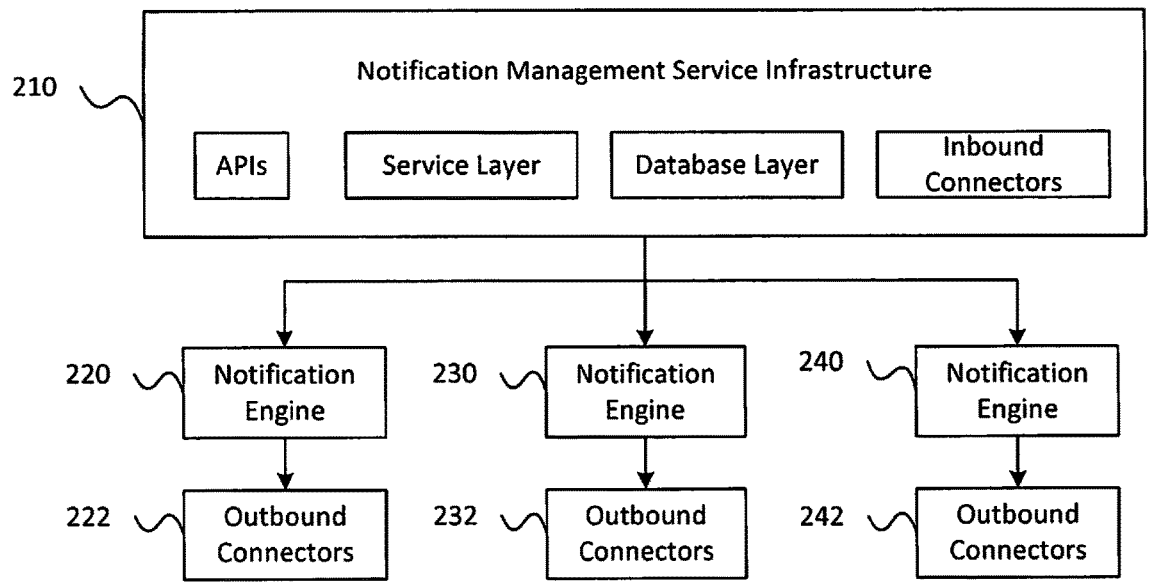
FIG. 2 is a block diagram illustrating aspects of a notification system architecture in accordance with an embodiment of the present disclosure.

As shown in FIG. 1, a notification engine 130 may include flow control service logic 132 and attempt generation logic 134. It is noted that although the FIG. 1 shows a single notification engine 103, embodiments of the present disclosure may utilize a plurality of notification engines, as illustrated in FIG. 2. As described herein, notification engines, such as the notification engine 130, may utilize various techniques to more efficiently handle processing of notification requests. For example, where the notification system 110 utilizes multiple priority levels, the notification system 110 may assign one or more different notification engines to each different priority level, thereby enabling notification requests of all priority levels to be processed by the notification system in accordance with an expected level or quality of service. For example, a first notification engine may be dedicated to processing only notifications for a highest priority level, while a second notification engine may be dedicated to processing notifications for two or more lower priority levels. In such an arrangement, each notification engine may be assigned to process notification requests for only their associated priority level(s). However, such an implementation may provide decreased performance and/or underutilization of a notification engine if a quantity of notification requests for a particular priority level is low. If this occurs, the notification engine that is assigned to the priority level experiencing a low volume of notification requests may be tasked with processing notification requests for an additional priority level to maintain the notification engine at a desired utilization.

The attempt generation logic 134 may be configured to retrieve one or more notification requests from the one or more notification request queues 120, and to expand the retrieved one or more notification requests into broadcasts that include one or more attempts (e.g., messages intended for transmission to one or more recipients). In an embodiment, the attempt generation logic 134 may be configured to generate attempts for retrieved notification request based on the information included in each retrieved notification request. For example, a notification request may identify a pool intended recipients specifically, such as by specifying one or more telephone numbers, e-mail addresses, or other types of contact information, or may identify the pool of recipients generally, such as by specifying a zip code, a group identifier (e.g., a name of an organization, club, etc.), or other types of information which may be used to designate the pool of intended recipients, and may indicate the broadcast is to be generated as a plurality of SMS attempts. Based on this information, the attempt generation logic 134 may generate a plurality of attempts, and each attempt may be an SMS message may be configured for transmission to one of the intended recipients and may include the message content specified in the notification request. As described above, where the pool of intended recipients is identified generally, the information stored in the contacts database 106 may be utilized to determine the intended recipients, as well as contact information for transmitting attempts to the intended recipients.

In embodiments, a notification request may include parameters for transmitting an attempt via one or more secondary channels of communication. For example, a primary channel may be specified as an SMS message, and a secondary channel may specify an AVR message. In such a scenario, the attempt generation logic 134 may generate a plurality of SMS messages for transmission to the intended recipient(s) identified by the notification request, and may generate a plurality of additional attempts that include telephone numbers for accessing the AVR message. If transmission of an attempt to an intended recipient via the primary channel fails or is otherwise unable to be confirmed by the notification system 110 as having been received, the second attempt for the intended recipient may be transmitted over the secondary channel in an effort to ensure that the intended recipient receives the notification. It is noted that although the description above indicates that notification requests may be configured to specify a primary channel for transmitting attempts to recipients and a secondary channel for transmitting the attempts to the intended recipients, embodiments are not limited to a primary channel and a secondary channel for transmitting attempts. For example, notification requests may specify a single channel for delivering an attempt to an intended recipient, or may specify two or more channels for delivering an attempt to an intended recipient. Further, it is noted that primary and secondary channels for transmitting attempts to intended recipients may utilize different primary channels and/or different secondary (or tertiary, etc.) channels for different intended recipients. In embodiments, the particular channels selected as the primary channel and the secondary (or tertiary, etc.) channels may be specified in the notification request or determined based on information stored in a database accessible to the notification system 110, such as information included in the contacts database 106.

As the attempts are generated by the attempt generation logic 134, they may be assigned to one of a first plurality of attempt queues for subsequent processing by the flow control service logic 132. The first plurality of attempt queues may include an attempt queue for each priority level that the notification engine is configured to process, and may also include additional attempt queues for large broadcasts (e.g., notification requests that result in generation of a significant number of attempts being generated). The additional attempt queues may be dynamically established for each large broadcast. For example, upon detecting that a notification assigned to the notification engine 130 is associated with a large broadcast, the notification engine 130 may establish an additional attempt queue that is specifically utilized to store attempts generated during processing of the large broadcast. When all attempts generated for a large broadcast have been processed by the flow control logic 132 and the attempt queue specifically established for that large broadcast is empty, the attempt queue may be torn down and the resources allocated to that attempt queue may be reallocated (e.g., to another attempt queue established for another large broadcast, or to a general pool of resources that may be utilized for processing operations of the notification engine 130 or some other component of the notification system 110).

As briefly described above, the first plurality of attempt queues may serve as input queues for the flow control service logic 132, which may be configured to implement adaptive flow control with respect to the attempts generated by the attempt generation logic 134. For example, the flow control service logic 132 may include a set of rules configured to control allocation of attempts stored in the first plurality of attempt queues to a second plurality of attempt queues, where the second plurality of attempt queues includes attempt queues configured to store attempts associated with a specific connector. For example, if the connectors 160 of the notification engine 130 include a first connector configured to facilitate transmission of attempts via a first communication channel (e.g., a communication channel facilitating transmission of SMS messages) and a second connector configured to facilitate transmission of attempts via a second communication channel (e.g., a communication channel facilitating transmission of e-mail messages). The set of rules provided by the flow control logic 132 may be configured to select attempts from different ones of the first plurality of attempt queues for assignment to particular attempt queues of the second plurality of attempt queues. More particularly, the set of rules provided by the flow control logic 132 may be configured to select attempts from different ones of the first plurality of attempt queues for assignment to particular attempt queues of the second plurality of attempt queues in a manner that provides fairness to different broadcast priority levels and to mitigate occurrences of starvation.

Selection of attempts from the first plurality of attempt queues in accordance with the set of rules of the flow control logic 132 may result in attempts from different ones of the first plurality of attempt queues being interleaved into each of the second plurality of attempt queues according to the type of connector each attempt requires. For example, a first attempt queue of the first plurality of attempt queues may be associated with a first priority level, a second attempt queue of the first plurality of attempt queues may be associated with a second priority level, and a third attempt queue of the first plurality of attempt queues may be associated with a large broadcast being processed by the notification engine 130. During each transmission period, the set of rules may be configured to select a number of attempts from each of the first, second, and third attempt queues for assignment to different ones of the second plurality of attempt queues (e.g., the connector-specific attempt queues). In this manner, attempts from each of the first plurality of attempt queues are scheduled for transmission (e.g., assigned to one of the second plurality of attempt queues). In this manner, the set of rules of the flow control service logic 132 may prevent starvation of a particular priority level or large broadcast (e.g., because attempts are removed from each of the first plurality of attempt queues and assigned to one of the second plurality of attempt queues during each transmission period). Additionally, interleaving attempts selected from among the first plurality of attempt queues during assignment of attempts to the second plurality of attempt queues prevents starvation with respect to particular types of attempts (e.g., SMS attempts, AVR attempts, and the like), and may enable attempts from multiple notification requests submitted by different entities to be processed concurrently, thereby providing a multi-tenant notification system.

Interleaving attempts from large and small broadcasts may also provide additional benefits. For example, as explained above, legacy notification systems may experience starvation with respect to processing of smaller broadcasts because large broadcasts are processed in their entirety; however, this may also result in bottlenecks with respect to receiving responses from the recipients. This is because responses are typically, but not always, received in the order in which their associated attempts were transmitted. As such, when a broadcast experiences starvation on the transmit side, it is very likely that responses to that broadcast will also experience starvation with respect to receipt and processing by the notification system (e.g., because there will be a significant quantity of responses generated by the large broadcast that caused the starvation on the transmit side).

In addition to being utilized to select attempts, the set of rules of the flow control service logic 132 may be configured to determine the quantity of attempts selected from each of the first plurality of attempt queues and/or the quantity of attempts assigned to particular ones of the second plurality of attempt queues during a particular transmission period. For example, the set of rules of the flow control service logic 132 may be configured to apply a set of weights to the first plurality of attempt queues to determine the quantity of attempts assigned to each attempt queue. In an embodiment, the set of weights may dictate how many attempts are selected from each of the first plurality of attempt queues. For example, assume that the first plurality of attempt queues includes a first attempt queue of the first plurality of attempt queues may be associated with a first priority level, a second attempt queue of the first plurality of attempt queues may be associated with a second priority level, and a third attempt queue of the first plurality of attempt queues may be associated with a large broadcast being processed by the notification engine 130. The set of weights may include three weighting factors, one for each queue of the first plurality of queues, and the weighting factors may be used to determine the number of attempts to select from each of the first plurality of attempt queues. For example, assuming the set of weighting factors for the first, second, and third attempt queues are 20%, 50%, and 30%, respectively, 20% of the attempts selected by the flow control service logic 132 during a particular transmission period may be selected from the first attempt queue, 50% of the attempts selected by the flow control service logic 132 during the particular transmission period may be selected from the second attempt queue, and 30% of the attempts selected by the flow control service logic 132 during the particular transmission period may be selected from the third attempt queue (e.g., the attempt queue corresponding to the large broadcast). It is noted that the particular weighting factors and numbers of attempt queues included in the first and second plurality of attempt queues in the examples above have been provided for purposes of illustration, rather than by way of limitation, and that other numbers of queues and/or weighting factors may be utilized by embodiments of the present disclosure.

In addition to utilizing the set of rules and the set of weights described above, the flow control service logic 132 may be configured to take into account capacity of each of the connectors 160. For example, if many notification request assigned to a notification engine 130 result in creation of many attempts for a single connector type (e.g., a connector providing a communication channel for transmitting SMS message, etc.), the load on the connector corresponding may become heavy. In an embodiment, when load on a particular connector reaches a threshold level, the set of rules may be configured to select attempts from among the first plurality of attempts in a manner that reduces the load on that particular connector, such as by selecting attempts that utilize other types of connectors. In this manner, the set of rules of the flow control service logic 132 may prevent a heavily loaded connector from becoming a bottleneck. Additionally or alternatively, the set of rules of the flow control service logic 132 may be configured to bring an additional connector online to reduce the load on the particular connector. For example, upon detecting that a particular connector is heavily loaded, resources for providing a second connector of the same type as the particular connector may be activated. This newly established connector may subsequently be used to reduce the load on the particular connector, and after the load is reduced to below the threshold the newly established connector may be torn down and the resources allocated to that connector may be released or reallocated (e.g., for other processing operations of the notification engine 130 or some other component of the notification system 110). Temporarily establishing new connectors in this manner may prevent bottlenecks within the notification system 110 and may enable the notification system 110 to meet various system requirements, such as satisfying threshold levels of performance as may be specified in one or more service level agreements between the operator of the notification system 110 and one or more entities that submit notification requests to the notification system 110.

The notification system 110 may additionally or alternatively implement various backpressure signaling processes to respond to excess loading conditions. For example, system components may be configured to monitor their current load to determine whether they are becoming overloaded. A connector 190, for example, may monitor the number of attempts in its corresponding attempt queue (e.g., one of the second plurality of attempt queues), and may determine that it is becoming overloaded when the number of attempts exceeds a threshold level (e.g., 10% above the components processing capacity for a single transmission period, or some other metric). Upon determining that it is becoming overloaded, the connector 190 may provide backpressure signaling to one or more upstream components, such as the flow control service logic 132, to notify those upstream components of the high loading conditions being experienced by the connector 190. Such signaling may request that one or more work upstream components slow down activities that are creating the high load being experienced by the downstream component(s). Back-pressure may be used to control flow at three levels. At the first level, back pressure signaling may be used to slow or stop the rate at which notification requests are selected by a notification engine 130 for processing. This allows the notification engine 130 to be self-limiting, so that it will not take on more work than it is capable of processing in a timely fashion. At the second level, back pressure signaling may be used to slow or stop the rate at which attempts are generated from a notification request. This may be used when the number of queued attempts waiting to be processed (e.g., by the flow control service logic 132 and/or one of the connectors 190) has grown too large, and permits the notification engine 130 to work through its backlog of attempts. At the third level, back pressure signaling may be used to slow or stop the rate at which the notification system 110 schedules notifications for processing by one of the notification engines. This, in conjunction with the first approach, may ensure that notification broadcasts are not unduly delayed. It is noted that exemplary techniques described above have been provided for purposes of illustration, rather than by way of limitation, and the notification system architecture disclosed herein may implement other techniques to address and/or alleviate high loading conditions.

As attempts are assigned to the second plurality of attempt queues by the flow control service logic 132, various ones of the connectors 160 may select attempts from their corresponding queue for transmission to intended recipients. As described above, each of the attempt queues of the second plurality of attempt queues may correspond to a particular one of the connectors 160, and each of the connectors 160 may provide a different communication channel configured to facilitate transmission of a particular type of attempt (e.g., an SMS message, an e-mail message, an AVR message, and the like). For example, a first connector 160 may be configured to provide a communication channel for transmitting attempts to intended recipients via a cellular communication network, which may facilitate transmission of attempts comprising one or more SMS messages; a second connector 160 may be configured to provide a communication channel to an e-mail server, which may facilitate transmission of attempts to intended recipients as one or more e-mail messages; and a third connector 160 may be configured to provide a communication channel for transmitting attempts to intended recipients via a telecommunications network (e.g., the PSTN), which may facilitate transmission of attempts comprising one or more AVR messages.

As the attempts are transmitted via the connectors 160 and the communication network(s) 170, they may be received by various user devices, such as user devices 180a through 180n shown in FIG. 1. At least a portion of the transmitted attempts may be configured to prompt the recipient for feedback, such as to confirm receipt of the attempt or to provide additional information. The notification system 110 may include one or more inbound connectors 190 which may provide various communication channels for receiving feedback from recipients of attempts. For example, the inbound connectors 190 may include an inbound connector that communicatively couples the notification system 110 to an e-mail server configured to receive feedback in the form of one or more e-mail messages. It is noted the one or more inbound connectors 190 may include various different types of connectors, each of which may provide a communication channel configured to facilitate reception of feedback from one or more attempt recipients, and that an inbound connector for receiving e-mail feedback has been described for purposes of illustration, rather than by way of limitation. As feedback messages are received via the one or more inbound connectors, they may be assigned to a response queue 152. The notification engine 130 may include response processing logic 150 configured to analyze feedback and perform various operations based on the analysis of the received feedback, as described in more detail below.

As briefly described above, received feedback may be assigned to the response queue 152, which may be configured to store the feedback for subsequent processing by the response processing logic 150. In an embodiment, the notification engine 130 may include a plurality of inbound connectors 190 and/or a plurality of inbound response queues 152. For example, the notification engine 130 may include an inbound connector for each of a plurality of different communication channels, where each inbound connector is configured to facilitate reception of different types of feedback messages via their respective communication channels (e.g., a first inbound connector may provide a communication channel for receiving SMS feedback messages, a second inbound connector may provide a communication channel for receiving e-mail feedback messages, a third inbound connector may provide a communication channel for receiving AVR feedback messages, and so on). In embodiments utilizing multiple response queues 152, the notification engine 130 may include a separate response queue 152 for each of a plurality of different priority levels.

The response processing logic 150 may be configured to utilize the received feedback to control or configure various aspects of the operations of the notification engine 130. For example, where a notification specifies a primary channel for transmitting attempts to one or more recipients and a secondary channel for transmitting the attempts to the one or more recipients (e.g., when the primary channel fails to successfully deliver the attempt to the recipient), the response processing logic 150 may be configured to determine whether a particular attempt was successfully received and cancel transmission of successfully received attempts via one or more secondary communication channels. Thus, where an attempt (e.g., an SMS message) was successfully transmitted on a first communication channel (e.g., via a cellular communication network), the response processing logic 150 may cancel transmission of the attempt on one or more secondary communication channels (e.g., cancelling transmission of an e-mail message, and AVR messages, etc.). Additionally it is noted that in some instances feedback or responses associated with a particular attempt may be received from a device or system other than an intended recipient device. For example, where an attempt is transmitted as an e-mail message, but the e-mail address provided to the notification system 110 was incorrect or no longer active, the notification system 110 may receive feedback from an e-mail server, such as a message indicating that the e-mail address is incorrect or no longer an active or valid e-mail account. Thus, in some situations, the feedback received by the notification system 110 may not be generated by the intended recipient and may instead be generated by some intermediate system. In some instances, a more complex workflow could be supported. For example, the notification engine 130 may be configured to halt processing of a notification request after acknowledgment is received from a threshold number or percentage of respondents.

As briefly described above, the notification architecture 100 utilizes the three different types of databases, the attempt state database 108, the results database 118, and the notification request database 124, to support operations of the notification system 110. As notification requests are processed, the information stored in these databases may be dynamically updated to reflect various aspects of the current status of different phases of the processing.

For example, new records may be created in the notification requests database 120 as new notification requests are received by the notification system 110 via the application interface(s) 102. For a particular notification request, the record created in the notification requests database 120 may include information identifying the particular notification request (e.g., a notification request identification number of some other form of identifier), a timestamp indicating a date and time when the particular notification was received, information that identifies the entity that submitted the particular notification request, information indicating a priority level of the particular notification request, other information, such as a size of the particular notification request, or a combination of these types of information. As described above, a notification management service 120 may assign received notification requests to particular notification engines operating within the notification architecture 100. As the notification requests are assigned to different notification engines, the corresponding records at the notification requests database 120 may be updated to identify the notification engine 130 to which the notification requests have been assigned and may also be updated to include a timestamp corresponding to when the notification requests were assigned to their respective notification engines for processing.

Similarly, the notification engines 130 operating within notification system 110 in accordance with the notification architecture 100 may periodically update the information stored in their corresponding attempt status database 108. For example, upon being assigned to process a newly received notification request, a notification engine 130 may create a record in its corresponding attempt status database 108 to reflect that it has been assigned the newly received notification request. Additionally, the notification engine 130 may include additional information in the record, such as information identifying a priority level of the notification request, information identifying the intended recipients of the broadcast that is to be generated from the notification request, contact information for transmitting attempts generated for the broadcast to the intended recipients over one or more communication channels, other information, or a combination thereof. In some instances, all of the contact information for the intended recipients may be included in the notification request. In other instances, at least a portion of the contact information added to the record for the notification at the attempt status database 108 may be retrieved from the contacts database 106. By adding the contact information retrieved from the contacts database 106 to the record at the attempt status database 108, the notification engine 130 may not need to re-access the contacts database 106 at a later time, such as to retrieve contact information associated with a secondary communication channel in the event that an attempt via a primary communication channel fails. Additionally, it is estimated that configuring the notification architecture 100 to utilize local databases to process notification requests (e.g., generate attempts) may improve performance two orders of magnitude when compared to legacy notification system and architectures, which often experience bottlenecks caused by high demand for access to certain system databases, such as databases from which contact information may be retrieved. Thus, the notification architecture 100 provides a significant improvement over legacy notification systems and architectures.

As attempts associated with the notification request are generated by the notification engine 130 via the attempt generation logic 134, the notification engine 130 may update the record(s) at the attempt status database 108 to reflect that those attempts have been created. Thus, the attempt status database 108 may provide a snapshot that reflects the current state of the attempt generation process, including identifying which attempts for a broadcast have been generated and which attempts still need to be generated. Additionally, as attempts are assigned to various ones of the second plurality of queues (e.g., the attempt queues corresponding to the connectors of the notification engine 130) for subsequent transmission by the connectors 190 of the notification engine 130, the record at the attempts status database 108 may be updated to reflect that those attempts have been scheduled for transmission. Further, as attempts are selected and transmitted by the connectors 190 from their respective queues, the connectors 190 may update the corresponding records at the attempt status database 108 to indicate the transmission of those attempts. Additionally or alternatively, the connectors 190 may create or update records corresponding to the transmitted attempts at the results database 118. For example, upon transmitting a particular attempt via a connector 190, the connector 190 may update the results database 118 to indicate that the particular attempt of a notification request has been transmitted. Records and information associated with transmission of attempts may include information that identifies the particular communication channel over which the attempt was transmitted (e.g., SMS, e-mail, AVR, etc.), a timestamp corresponding to the time the attempt was transmitted over the particular communication channel, and other information.

Additionally, as responses to various transmitted attempts are received by the response processing logic 150 via the inbound connectors 190 and the response queue 152, the response processing logic 150 may be configured to update the information stored at the results database 118. For example, the notification system architecture 100 may support a variety of feedback mechanisms that may be utilized to provide feedback to the notification system 110. These mechanisms may include unary feedback mechanisms that enable a user may confirm receipt of an attempt and if a confirmation is not received it may be assumed that the attempt has not been received. As an example, an attempt may include a URL that triggers a response (e.g., an http response) when selected by the recipient of the attempt, and if the response is not received the notification system 110 may deem that attempt as having not been received. Additionally, the feedback mechanisms may include binary feedback mechanisms, which may facilitate two different response options (e.g., yes and no), and the notification system 110 may interpret one response as confirmation that an attempt has been received and may interpret the other as having not been received (or some other type of functionality). As an example, an attempt via SMS or e-mail may result in a first type of response confirming receipt of the attempt, such as a response provided via SMS or an http response generated via selection of a URL included in the e-mail attempt, or a second type of response that indicates the attempt has not been received, such as a response indicating that the number or address that the attempt was sent to is invalid. Additionally, the response mechanisms may facilitate polling, which may provide users with a plurality of different options for responding. For example, an attempt may comprise a survey that includes one or more response options. As responses are received and analyzed by the response processing logic 150, the information stored in the results database 118 may be updated. In an embodiment, the information maintained in the attempt state database 108 and the results database 118 may be stored in a single database, rather than separate databases.

As shown in FIG. 1, the attempts database 108, the results database 118, and the notification request database 124 may be maintained external to the notification engine 130. In this manner, failure of one or more components of the notification engine 130 may have minimal impact on the information stored in the databases, allowing the information stored in one or more of those databases to be used to configure a new notification to resume processing from a point where the failed notification engine stopped processing its assigned notification requests, or enabling the notification engine 130 (or one or more of its components) to be restarted or rebooted after which processing may resume from a point near when the failure occurred, as described in more detail below. However, in an embodiment, the attempt state database 108 may implemented within resources (e.g., memory resources) used to provide the notification engine 130. This may facilitate faster access to the information stored in the attempts database 108 and/or faster updating of the information stored in the attempts database 108.

In an embodiment, various components of the notification system 110 may utilize various timers to monitor notification request processing. The notification management service 120 may use one or more timers to determine whether notification requests are being processed in a timely manner. For example, the notification management service 120 may configure a timer upon assigning a received notification request to a particular notification engine 130, and if the particular notification engine 130 has not started processing the notification request when the timer expires, the notification management service 120 may reassign the notification request to another notification engine 130. The notification engine 130 may utilize a first timer to check for attempts which have been generated but were not processed by a connector. If the first timer expires and the notification engine 130 determines that there are attempts that have not been transmitted by a connector (e.g., not transmitted during the period of time corresponding to the timer), the attempt generation logic 134 may generate another copy of the attempt (e.g., a retry attempt), which may be dynamically allocated to a queue for transmission, as described herein. In embodiments, the notification engine 130 may verify that the retry attempt has not been transmitted prior to allocating the retry attempt to a queue for transmission (e.g., to avoid a potential race condition where the original attempt is transmitted after the retry attempt). Additionally, the notification engine 130 may utilize a second timer to monitor the retrieval of contact information from the contacts database 106 (e.g., to refresh the locally stored contact information, determine whether results of a query of the contacts database 106 have been received or timed out, or for other purposes).

The information captured by the three different databases 108, 118, 120 may increase the resiliency of the notification system, such as improving the rate at which the system can complete processing of notification requests in the event that a notification engine 130 fails (e.g., due to an outage with respect to an application web service infrastructure upon which the notification engine is instantiated or some other type of failure). For example, in response to failure of a notification engine 130, the notification system 110 may determine what notification requests were being processed by the failed notification engine 130 based on the records stored at the notification request database 124, and may reassign those notification requests to other notification engines 130. The snapshot of notification request processing provided by the attempt status database 108, alone or in combination with the information recorded in the results database 118, may enable the new notification engine(s) 130 to resume processing the notification requests that were previously assigned to the failed notification engine 130, and because those snapshots indicate which attempts were transmitted, and which attempts were not, the new notification engine(s) 130 may only need to generate and transmit those attempts that had not previously been transmitted. If the notification system architecture did not support the aforementioned databases, the new notification engine(s) 130 would need to reprocess each notification request in its entirety, which could result in the new notification engine(s) 130 generating and transmitting a large number of attempts that had already been transmitted (e.g., prior to the failure).

The notification system architecture 100 may also facilitate other types of improvements with respect to failure recovery operations. For example, if a component of the notification engine, such as the process utilized to generate attempts, fails or experiences an error, the notification engine may be restarted or rebooted and utilize the attempt database 108 to resume processing where it left off (e.g., when the failure or error occurred). The ability to simply restart or reboot and resume processing may facilitate rapid recovery from certain types of failures, thereby increasing system availability and improved resource utilization. As shown above, the notification system architecture 100 solves several of the problems experienced by legacy notification systems, and provides additional types of improvements, such as improved resiliency and failover recovery.

Referring to FIG. 2, a block diagram illustrating additional aspects of a notification system architecture in accordance with an embodiment of the present disclosure is shown. As shown in FIG. 2, a notification system implementing a notification architecture in accordance with embodiments of the present disclosure may include a notification management service 210 that is configured to manage a plurality of notification engines 220, 230, 240. As described above, each of the plurality of notification engines 220, 230, 240 may include one or more connectors configured to provide one or more communication channels through which attempts may be transmitted to one or more intended recipients. For example, as shown in FIG. 2, the notification engine 220 includes one or more connectors 222, the notification engine 230 includes one or more connectors 232, and the notification engine 240 includes one or more connectors 242.

The notification management service 210 may be configured to integrate with various application interfaces, such as the application interface(s) 102 of FIG. 1, and may provide service layer and database layer functionality to support processing of received notification requests. For example, the service layer functionality may include providing the functionality described above with respect to the notification management service 120, such as to receive notification requests from one or more requestor devices and application interfaces, assign those notification requests to different ones of the plurality of notification engines 22, 230, 240, monitor processing of notification requests and reassign them as necessary, as described above with reference to FIG. 1, create and update records at a notification request database (e.g., the notification request database 124 of FIG. 1), and manage processing resources available to the notification system, such as to bring additional notification engines online, take notification engines offline, allocate additional processing resources to or de-allocate processing resources of one or more instantiated notification engines, and other functionality, as described in more detail below.

With respect to managing processing resources, the notification system architecture of embodiments may facilitate improved utilization of resources accessible to the notification system. For example, whereas legacy notification systems provide active-passive systems, notification systems utilizing the notification system architecture disclosed herein may provide an active-active notification system, which means that the notification system does not need to maintain or reserve system resources in an idle or offline state for potential use in response to a failure condition. The distributed active-active nature of the notification system architecture disclosed herein allows the notification system to be automatically and dynamically (e.g., on demand) scaled horizontally very quickly, such as in response to sudden spikes in demand or events for which notification broadcasts need to be sent. For example, if an event, such as a natural disaster, occurs at a particular location, one or more completely new notification stacks (e.g., notification engines and their connectors, databases, etc.), may be automatically built and brought online to serve attempts to intended recipients. Because the notification system architecture is configured to facilitate distributed management of notification request processing, the new notification stacks may be instantiated using processing resources local to the particular location where the event is occurring (or occurred). For example, a new notification engine may be brought online using processing resources (e.g., of a cloud-based system) in the same location as the event, such as in a same city, state, or country). Establishing the new notification stacks local to the event may enable the notification broadcasts to more readily delivered to the intended recipients in a timely manner. After the notification request has been processed and the broadcast has been transmitted, these newly created notification stacks may be taken offline and/or the resources that were allocated to those notification stacks may be reallocated for other system processing operations. In addition to providing improved capabilities with respect to scaling the notification system architecture, the ability to dynamically allocate and de-allocate processing resources, the overall cost for operating the notification system may be reduced.

Due to its distributed active-active nature and improved scaling capabilities, the notification system architecture disclosed herein may facilitate more dynamic or "orchestration enabled" notification systems. For example, as explained above, when the system needs additional capacity in a particular region or regions, new notification engines or stacks may be automatically constructed in only those geographic regions where the additional capacity is needed. Additionally, when capacity exceeds demand, the notification management service may dynamically scale down the notification system, such as to tear down a notification stack. Thus, the notification system architecture is configured to dynamically respond to changing needs of the notification system in a geographically distributed manner. It is noted that notification engine stacks may be built and tore down while the notification system is up and running, which improves the availability of the notification system.

The distributed active-active nature of the notification system architecture also facilitates improved fault tolerance. For example, when a failure occurs, a new notification stack may be established (or the failed notification stack may be restarted or rebooted) and may resume processing of notification requests at a point that is the same as, or very close to, where the processing had progressed prior to the failure. As described above, this may be accomplished, at least in part, by maintaining a database (e.g., the attempts database 108) that tracks the progression of notification processing by the notification engine. Additionally, it is noted that the various databases (e.g., the attempts database 108, the results database 118, and the notification requests database 120 of FIG. 1) may provide multiple levels where the processing of a broadcast may be confirmed to ensure that it successfully reaches the intended recipients and/or to confirm that notification requests are being timely and efficiently processed. It is also noted that while the improved scaling capabilities provided by the notification management infrastructure's ability to dynamically add and remove notification stacks, this capability may also be extended to existing notification stacks. For example, capacity to process notification requests may be dynamically adjusted at the notification engine level by adding and removing processing resources configured to support the functionality provided by one or more of the notification engine's underlying components, such as by adding additional connectors to increate attempt transmission capacity, or adding additional processing resources to increase the notification engine's capacity to generate attempts. Thus, the improved scalability afforded by the notification system architecture of the present disclosure may be applied at varying levels depending on the needs of the system (e.g., small increases in demand may be resolved by adding resources to increase capacity of an existing notification stack while large increases in demand may be resolved by establishing a new notification stack).

In addition to establishing new notification stacks to respond to increased demand and/or failover conditions, the notification management service 210 may be configured to automatically establish new notification stacks for other purposes. For example, governments in some countries filter out or block transmissions of data over certain communication channels if the transmissions do not originate from within that country. If a legacy notification system does not have notification processing resources within that country, it will be unable to send a broadcast to one or more recipients located within that country. In contrast, the notification management service may automatically establish a new notification stack (e.g., a new notification engine) within that particular country, thereby allowing traffic (e.g., the attempts) to be provided to intended recipients located within that country (e.g., because the notifications originated from within that particular country).

It is noted that automatically building a new notification stack is more than merely creating a new cloud instance of a notification engine. For example, as explained above with reference to FIG. 1, each notification engine is configured to process notification requests using its own set of connectors for transmitting attempts via different communication channels (e.g., e-mail, SMS, calls, AVR, and the like). Thus, establishing a new notification stack also includes establishing new connectors configured to provide communication channels configured to communicatively couple the new notification engine to one or more communication networks (e.g., the one or more communication networks 170 of FIG. 1). This differs from merely instantiating an instance of a notification engine, which would share existing connectors (e.g., connectors established for other notification engines that were already in operation) and possibly even computational resources, such as memory. In addition to establishing new connectors, establishing a new notification engine may also include establishing a new instance of a notification management service (e.g., a new instance of the notification management service 210). This new instance of the notification management service may include components such as the notification management service 120, application interfaces for receiving notification requests from the application interfaces 102, new inbound connectors, new database components, and the like. The new notification management service may operate independently of other notification engines and/or other notification management infrastructures in a standalone fashion, or may operate in coordination with other notification engines and/or other notification management infrastructures in a federated manner. Distributing the notification management service in this manner may provide various benefits, such as improved scalability, resiliency, data isolation, security or regulatory requirements compliance.

As shown above, the notification management service utilized by the notification architecture disclosed herein enables notification systems having high availability, reduced bottlenecks, rapid and on-demand scaling capabilities across various geographies, and improved fault tolerance to be realized without requiring state information to be mirrored to different databases. One factor contributing to these enhancements is that the notification engines are configured to operate independently or in a manner that only loosely coordinates operations between notification engines. For example, legacy notification systems utilize a centralized approach to distribution of data, creating many points where bottlenecks may occur. Such constraints are eliminated by the decentralized approach utilized by the disclosed notification system architecture. Additionally, scalability is closely correlated with the number of notification engines in the disclosed notification system architecture. This means that capacity may be doubled by simply doubling the number of established notification engines. In contrast, legacy notification systems, which utilize an active-passive configuration, may require additional resources in order to realize a similar capacity increase.

Figure 3:
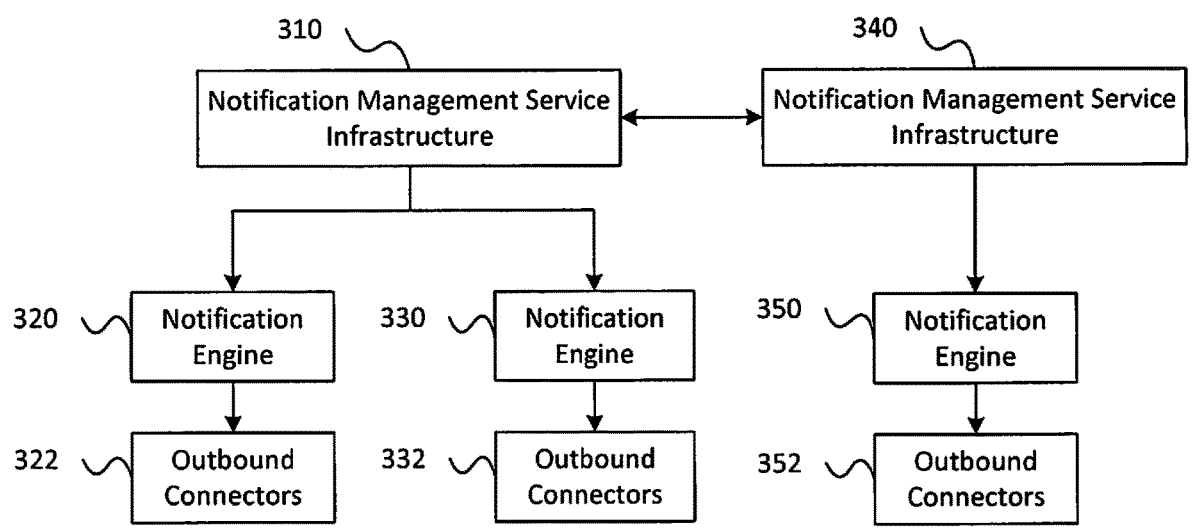
FIG. 3 is a block diagram illustrating aspects of providing distributed management in a notification system architecture in accordance with embodiments of the present disclosure.

Referring to FIG. 3, a block diagram illustrating aspects of providing distributed management in a notification system architecture in accordance with embodiments is shown. As shown in FIG. 3, a notification system may include a first notification management service 310 and a second management infrastructure 340. The first notification management service 310 may manage processing of notification requests utilizing a notification engine 320 having outbound connectors 322 and a notification engine 330 having outbound connectors 332, while the second notification management service 340 may manage processing of notification requests utilizing a notification engine 350 having outbound connectors 352. As described above, the first notification management service 310 and the second management infrastructure 340 may support a geographically distributed notification system. For example, the first notification management infrastructure 310 may be configured to support notification request processing in a first geographic region and the second management infrastructure 340 may be configured to support notification request processing in a first geographic region.

In some instances, the first notification management service 310 and the second notification management service 340 may cooperate to process notification requests. For example, the first notification management service 310 may receive a notification request that identifies a pool of intended recipients that includes a first set of recipients located within the first geographic region and a second set of recipients located within the second geographic region. Upon receiving the notification request, the first notification management may analyze the pool of identified recipients and discover that it includes the second set of recipients (e.g., which are located in the geographic region supported by the second notification management service 340), and may communicate the notification request (or a portion of the notification request) to the second notification management service 340. Each of the notification management infrastructures 310, 340 may then assign the notification request to one of their respective notification engines for processing. For example, one of the notification engines 320, 330 may process the notification request with respect to the first set of intended recipients, while the notification engine 350 may process the notification request with respect to the second set of intended recipients. In this manner, the notification request may be processed locally with respect to the intended recipients identified by the notification request despite being received by the first notification management service associated with the first geographic region. Thus, the notification system architecture of embodiments may facilitate management, processing, and distribution of notification requests in a globally local manner. That is to say, the notification system architecture may be configured to distribute notification requests across disparate geographic areas, with each geographic area serving attempts corresponding to the notification request locally, such as from within a corresponding geographic region. This may improve notification deliverability, such as to increase the likelihood that each notification reaches its intended recipient (e.g., is not filtered out by a government authority, etc.). Additionally, the globally local processing facilitated by the notification system architecture may also reduce delays in delivering the notifications (e.g., because the notification requests are processed by notification engines "local" to the intended recipients).

Referring to FIG. 4, a flow diagram of an exemplary method for processing one or more notification requests via a notification system implementing a notification system architecture in accordance with embodiments of the present disclosure is shown as a method 400. In an embodiment, the method 400 may be implemented by one or more of the notification systems illustrated with respect to FIGS. 1-3. Additionally, the steps of the method 400 may be stored as instructions (e.g., the instructions 116 of FIG. 1) that, when executed by one or more processors (e.g., the one or more processors 112 of FIG. 1), cause the one or more processors to perform the operations of the method 400.

At step 410, the method 400 may include receiving, by a notification management service of a notification system, a plurality of notification requests. The notification requests may be received via an application interface, as described above with reference to FIGS. 1 and 2, and each notification request of the plurality of notification requests may include message content and recipient information. As described above, the notification system may include one or more notification engines configured to process received notification requests. At step 420, the method 400 includes allocating, by the notification management service, each notification request of the plurality of notification requests to at least one notification engine.

At step 430, the method 400 includes generating, by a first notification engine of the one or more notification engines, a plurality of attempts. Each attempt may correspond to a notification request allocated for processing by the first notification engine and may include information associated with the message content included in the corresponding notification request, as described above with reference to FIG. 1. At step 440, the method includes assigning, by the first notification engine, each attempt of the plurality of attempts to a particular attempt queue. The particular attempt queue may be configured to store attempts for transmission to an intended recipient and may be associated with a particular connector of a plurality of connectors associated with the notification engine. Each connector may be communicatively coupled to one of a plurality of different communication networks to facilitate transmission of attempts via different communication channels, as described above with reference to FIG. 1.

At step 450, the method includes selecting a first set of attempts from among the plurality of attempt queues, and, at step 460, transmitting, via at least one connector of the first plurality of connectors, the first set of attempts to the first set of intended recipients via at least one communication network of the plurality of different communication networks. The first set of attempts may include attempts configured for transmission to a first set of intended recipients, where the first set of intended recipients may be identified based on the recipient information included in the notification requests corresponding to each of the first set of attempts.

At step 470, the method 400 includes maintaining status information associated with processing each of the first plurality of attempts at one or more databases. The status information may include at least one of information that identifies the plurality of notification requests, information that identifies attempts that have been generated by the first notification engine, information that identifies a transmission status of each of the attempts that have been generated by the first notification engine, information that indicates a receive status for attempts transmitted via one or more connectors of the first plurality of connectors, and response information associated with one or more responses to the attempts transmitted via the one or more connectors of the first plurality of connectors, or other information, as described above with reference to FIG. 1. It is noted that the method 400 may include additional operations, such as various operations corresponding to the functionality provided by notification systems utilizing notification system architectures in accordance with embodiments of the present disclosure, as described above with reference to FIGS. 1-3.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed:

1. A method for providing a scalable and fault tolerant high-performance notification system for processing notification requests, the method comprising:

receiving, by a notification management service of a notification system, a plurality of notification requests via an application interface, each notification request of the plurality of notification requests comprising message content and recipient information, wherein the notification system comprises a plurality of notification engines configured to process received notification requests;

allocating, by the notification management service, each notification request of the plurality of notification requests to at least one notification engine of the plurality of notification engines;

generating, by a first notification engine of the plurality of notification engines, a first plurality of attempts, wherein each attempt corresponds to a notification request allocated for processing by the first notification engine and comprises information associated with the message content included in the corresponding notification request;

assigning, by the first notification engine, each attempt of the first plurality of attempts to a particular attempt queue included in a first plurality of attempt queues configured to store each attempt of the first plurality of attempts for transmission to an intended recipient, wherein each attempt queue of the first plurality of attempt queues corresponds to a connector of a first plurality of connectors, and wherein each connector of the first plurality of connectors is communicatively coupled to one of a plurality of different communication networks;

selecting a first set of attempts from among the first plurality of attempt queues, the first set of attempts comprising attempts configured for transmission to a first set of intended recipients, wherein the first set of intended recipients are identified based on the recipient information included in the notification requests corresponding to each of the first set of attempts;

transmitting, via at least one connector of the first plurality of connectors, the first set of attempts to the first set of intended recipients via at least one communication network of the plurality of different communication networks;

maintaining status information associated with processing each of the first plurality of attempts at one or more databases, wherein the status information comprises at least one of information that identifies the plurality of notification requests, information that identifies attempts that have been generated by the first notification engine, information that identifies a transmission status of each of the attempts that have been generated by the first notification engine, information that indicates a receive status for attempts transmitted via one or more connectors of the first plurality of connectors, and response information associated with one or more responses to the attempts transmitted via the one or more connectors of the first plurality of connectors;

dynamically scaling, by the notification management service, a capacity for processing notification requests, wherein dynamically scaling the capacity for, processing notification requests comprises at least one of:

creating a new notification stack that includes a second notification engine, a second plurality of connectors, and a second set of one or more databases configured to maintain status information associated with processing of one or more notification requests assigned to the second notification engine, and a plurality of attempt queues specific to the second notification engine, wherein each connector of the second plurality of connectors is communicatively coupled to one of the plurality of different communication networks;

modifying a notification engine, wherein modification of the notification engine includes at least one of:
de-allocating at least a portion of processing resources utilized by the notification engine to process notification requests; and
reallocating at least a portion of processing resources utilized by the notification engine to process notification requests;

adding at least one additional connector to the first plurality of connectors;

allocating additional processing resources to a flow control process of the first notification engine;

allocating additional processing resources to at least one connector of the first plurality of connectors; and creating a second notification management service configured to support the notification engine or a new notification engine associated with a newly created notification stack.

2. The method of claim 1, wherein the one or more databases includes an attempts database configured to store the information that identifies the attempts that have been generated by the first notification engine and the information that identifies the transmission status of each of the attempts that have been generated by the first notification engine, wherein the attempts database is further configured to store a copy of each notification request assigned to the first notification engine, contact information associated with recipients corresponding to each notification request assigned to the first notification engine, and at least one of information that indicates a receive status for attempts transmitted via one or more connectors corresponding to the notification engine, and response information associated with one or more responses to the attempts transmitted via the one or more connectors that corresponds to the notification engine, wherein the attempts database is maintained in memory resources allocated to the first notification engine.

3. The method of claim 1, wherein the one or more databases includes a results database configured to store the information that identifies the response information associated with one or more responses to the attempts transmitted via the one or more connectors of the first plurality of connectors, and wherein the attempts database is further configured to store information that identifies at least one of a generation status that indicates which attempts corresponding to notification requests assigned to the first notification engine have been generated, and a transmission status that indicates which attempts generated by the first notification engine have been transmitted.

4. The method of claim 1, wherein the one or more databases includes a notification request database configured to store the information that identifies the plurality of notification requests, and wherein the notification request database is configured to store at least one of information that identifies a particular notification assigned to process each of the plurality of notification requests, timestamp information that identifies when each of the plurality of notification requests was received, information that identifies an entity that submitted each of the plurality of notification requests, information that indicates a priority level of each of the plurality of notification requests, other information, information regarding a size of each of the plurality of notification requests.

5. The method of claim 1, further comprising:
establishing a new notification engine in response to detecting a failure of the first notification engine; and
configuring the new notification engine to resume processing one or more notification requests previously assigned to the first notification engine based on at least a portion of the information stored in the one or more databases, wherein the portion of the information stored in the one or more databases indicates a point at which processing the one or more notifications by the first notification engine ceased, and wherein the configuration of the new notification engine causes the new notification engine to resume processing the one or more notification requests previously assigned to the first notification engine from a point substantially corresponding to the point at which processing the one or more notifications by the first notification engine ceased.

6. The method of claim 1, further comprising:
restarting one or more components of the first notification engine in response to a failure condition; and
resuming, by the first notification engine, processing of one or more notification request allocated for processing by the first notification engine based on at least a portion of the information stored in the one or more databases, wherein the processing is resumed from a point substantially corresponding to the point at which the failure condition occurred.

7. A non-transitory computer-readable storage medium storing instructions that, when executed by one or more processors, cause the one or more processors to perform operations for providing a scalable and fault tolerant high-performance notification system for processing notification requests, the operations comprising:

receiving, by a notification management service of a notification system, a plurality of notification requests via an application interface, each notification request of the plurality of notification requests comprising message content and recipient information, wherein the notification system comprises a plurality of notification engines configured to process received notification requests;

allocating, by the notification management service, each notification request of the plurality of notification requests to at least one notification engine of the plurality of notification engines;

generating, by a first notification engine of the plurality of notification engines, a first plurality of attempts, wherein each attempt corresponds to a notification request allocated for processing by the first notification engine and comprises information associated with the message content included in the corresponding notification request;

assigning, by the first notification engine, each attempt of the first plurality of attempts to a particular attempt queue included in a first plurality of attempt queues configured to store each attempt of the first plurality of attempts for transmission to an intended recipient, wherein each attempt queue of the first plurality of attempt queues corresponds to a connector of a first plurality of connectors, and wherein each connector of the first plurality of connectors is communicatively coupled to one of a plurality of different communication networks;

selecting a first set of attempts from among the first plurality of attempt queues, the first set of attempts comprising attempts configured for transmission to a first set of intended recipients, wherein the first set of intended recipients are identified based on the recipient information included in the notification requests corresponding to each of the first set of attempts;

transmitting, via at least one connector of the first plurality of connectors, the first set of attempts to the first set of intended recipients via at least one communication network of the plurality of different communication networks;

maintaining status information associated with processing each of the first plurality of attempts at one or more databases, wherein the status information comprises at least one of information that identifies the plurality of notification requests, information that identifies attempts that have been generated by the first notification engine, information that identifies a transmission status of each of the attempts that have been generated by the first notification engine, information that indicates a receive status for attempts transmitted via one or more connectors of the first plurality of connectors, and response information associated with one or more responses to the attempts transmitted via the one or more connectors of the first plurality of connectors;

dynamically scaling, by the notification management service, a capacity for processing notification requests, wherein dynamically scaling the capacity for processing notification requests comprises at least one of:

creating a new notification stack that includes a second notification engine, a second plurality of connectors, and a second set of one or more databases configured to maintain status information associated with processing of one or more notification requests assigned to the second notification engine, and a plurality of attempt queues specific to the second notification engine, wherein each connector of the second plurality of connectors is communicatively coupled to one of the plurality of different communication networks;

modifying a notification engine, wherein modification of the notification engine includes at least one of:

de-allocating at least a portion of processing resources utilized by the notification engine to process notification requests; and reallocating at least a portion of processing resources utilized by the notification engine to process notification requests;

adding at least one additional connector to the first plurality of connectors;

allocating additional processing resources to a flow control process of the first notification engine;

allocating additional processing resources to at least one connector of the first plurality of connectors; and creating a second notification management service configured to support the notification engine or a new notification engine associated with a newly created notification stack.

8. The non-transitory computer-readable storage medium of claim 7, wherein the one or more databases includes an attempts database, a results database, and a notification request database.

9. The non-transitory computer-readable storage medium of claim 7, further comprising:

establishing a new notification engine in response to detecting a failure of the first notification engine; and configuring the new notification engine to resume processing one or more notification requests previously assigned to the first notification engine based on at least a portion of the information stored in the one or more databases, wherein the portion of the information stored in the one or more databases indicates a point at which processing the one or more notifications by the first notification engine ceased, and wherein the configuration of the new notification engine causes the new notification engine to resume processing the one or more notification requests previously assigned to the first notification engine from a point substantially corresponding to the point at which processing the one or more notifications by the first notification engine ceased.

10. The non-transitory computer-readable storage medium of claim 7, further comprising:

restarting one or more components of the first notification engine in response to a failure condition; and resuming, by the first notification engine, processing of one or more notification request allocated for processing by the first notification engine based on at least a portion of the information stored in the one or more databases, wherein the processing is resumed from a point substantially corresponding to the point at which the failure condition occurred.

11. A high-performance notification system for processing notification requests and having a notification system architecture that provides high scalability and fault tolerance, the notification system comprising:

a processor coupled to a memory;

a notification management service configured to:

receive a plurality of notification requests via an application interface, each notification request of the plurality of notification requests comprising message content and recipient information, wherein the notification system comprises a plurality of notification engines configured to process received notification requests; and allocate each notification request of the plurality of notification requests to at least one notification engine of the plurality of notification engines;

a first notification engine configured to:
generate a first plurality of attempts, wherein each attempt corresponds to a notification request allocated for processing by the first notification engine and comprises information associated with the message content included in the corresponding notification request; and assign each attempt of the first plurality of attempts to a particular attempt queue of a plurality of attempt queues;

a first plurality of connectors configured to:
select a first set of attempts from among the plurality of attempt queues for transmission to a first set of intended recipients; and transmit, via at least one connector of the plurality of connectors, the set of attempts to the first set of intended recipients via at least one communication network of a plurality of different communication networks, wherein each attempt queue of the plurality of attempt queues corresponds to a particular connector of a plurality of connectors, and wherein each connector of the plurality of connectors is communicatively coupled to one of the plurality of different communication networks; and one or more databases configured to maintain status information associated with processing of notification requests by the first notification engine, wherein the notification management service is configured to dynamically scale a capacity for processing notification requests, wherein dynamically scaling the capacity for processing notification requests comprises at least one of:

creating a new notification stack that includes a second notification engine, a second plurality of connectors, and a second set of one or more databases configured to maintain status information associated with processing of one or more notification requests assigned to the second notification engine, and a plurality of attempt queues specific to the second notification engine, wherein each connector of the second plurality of connectors is communicatively coupled to one of the plurality of different communication networks;

modifying a notification engine, wherein modification of the notification engine includes at least one of:
de-allocating at least a portion of processing resources utilized by the notification engine to process notification requests; and reallocating at least a portion of processing resources utilized by the notification engine to process notification requests;

adding at least one additional connector to the first plurality of connectors;

allocating additional processing resources to a flow control process of the first notification engine;

allocating additional processing resources to at least one connector of the first plurality of connectors; and creating a second notification management service configured to support the notification engine or a new notification engine associated with a newly created notification stack.

12. The notification system of claim 11, wherein the one or more databases includes an attempts database, a results database, and a notification request database.

13. The notification system of claim 11, wherein the notification management service is configured to:
establish a new notification engine in response to detecting a failure of the first notification engine; and
configure the new notification engine to resume processing one or more notification requests previously assigned to the first notification engine based on at least a portion of the information stored in the one or more databases, wherein the portion of the information stored in the one or more databases indicates a point at which processing the one or more notifications by the first notification engine ceased, and wherein the configuration of the new notification engine causes the new notification engine to resume processing the one or more notification requests previously assigned to the first notification engine from a point substantially corresponding to the point at which processing the one or more notifications by the first notification engine ceased.

14. The notification system of claim 11, wherein the notification management service is configured to:
restart one or more components of the first notification engine in response to a failure condition, and wherein the first notification engine is configured to resume processing one or more notification request allocated to the first notification engine a point substantially corresponding to the point at which the failure condition occurred based on at least a portion of the information stored in the one or more databases.

* * * * *

UNITED STATES PATENT AND TRADEMARK OFFICE
CERTIFICATE OF CORRECTION

PATENT NO. : 10,652,080 B2  
APPLICATION NO. : 15/819960  
DATED : May 12, 2020  
INVENTOR(S) : Eric Golin et al.

Page 1 of 1

It is certified that error appears in the above-identified patent and that said Letters Patent is hereby corrected as shown below:

In the Claims

At Column 27, Claim number 1, Line number 26, delete "for, processing" and replace with --for processing--.
At Column 28, Claim number 2, Line number 3, delete "notification engine" and replace with --first notification engine--.
At Column 28, Claim number 2, beginning on Line number 5, delete "notification engine" and replace with --first notification engine--.
At Column 30, Claim number 11, Line number 62, delete "notification system" and replace with --high-performance notification system--.
At Column 31, Claim number 11, beginning on Line number 1, delete "notification system" and replace with --high-performance notification system--.
At Column 31, Claim number 11, beginning on Line number 22, delete "transmit, via at least one connector of the plurality of connectors, the set of attempts" and replace with --transmit, via at least one connector of the first plurality of connectors, the first set of attempts--.
At Column 31, Claim number 11, beginning on Line number 28, delete "connector of a plurality of connectors, and wherein each connector of the plurality of connectors" and replace with --connector of a first plurality of connectors, and wherein each connector of the first plurality of connectors--.
At Column 32, Claim number 12, Line number 19, delete "notification system" and replace with --high-performance notification system--.
At Column 32, Claim number 13, Line number 22, delete "notification system" and replace with --high-performance notification system--.
At Column 32, Claim number 14, Line number 41, delete "notification system" and replace with --high-performance notification system--.

Signed and Sealed this  
Twenty-fifth Day of August, 2020

Andrei Iancu  
*Director of the United States Patent and Trademark Office*